United States Patent [19]
O'Brien, Jr. et al.

[11] Patent Number: 5,963,591
[45] Date of Patent: Oct. 5, 1999

[54] SYSTEM AND METHOD FOR STOCHASTIC CHARACTERIZATION OF A SIGNAL WITH FOUR EMBEDDED ORTHOGONAL MEASUREMENT DATA ITEMS

[75] Inventors: Francis J. O'Brien, Jr., Newport; Chung T. Nguyen, Bristol, both of R.I.

[73] Assignee: The United States of America as represented by the Secretary of the Navy, Washington, D.C.

[21] Appl. No.: 08/716,673

[22] Filed: Sep. 13, 1996

[51] Int. Cl.$^6$ ........................................... H04B 3/46
[52] U.S. Cl. ........................ 375/227; 375/346; 370/208
[58] Field of Search ................................. 375/227, 259, 375/346; 370/203, 206–208, 241

[56] References Cited

U.S. PATENT DOCUMENTS

| | | |
|---|---|---|
| 3,831,039 | 8/1974 | Henschel . |
| 4,063,180 | 12/1977 | Norman ............................... 375/351 X |
| 5,327,242 | 7/1994 | Naimpally et al. ...................... 348/606 |
| 5,675,553 | 10/1997 | O'Brien, Jr. et al. ................... 367/135 |

*Primary Examiner*—Young T. Tse
*Attorney, Agent, or Firm*—Michael J. McGowan; Michael F. Oglo; Prithvi C. Lall

[57] ABSTRACT

A signal processing system provides and processes a digital signal, generated in response to an analog signal, which includes a noise component and possibly also an information component representing four mutually orthogonal items of measurement information representable as a sample point in a symbolic four-dimensional hyperspatial reference system. An information processing and decision sub-system receives said digital signal and processes it to extract the information component. A noise likelihood determination sub-system receives the digital signal and generates a random noise assessment of whether or not the digital signal comprises solely random noise, and if not, generates an assessment of degree-of-randomness. The noise likelihood determination system controls whether or not the information processing and decision sub-system is used, in response to one or both of these generated outputs. One prospective practical application of the invention is the performance of a triage function upon signals from sonar receivers aboard naval submarines, to determine suitability of the signal for feeding to a subsequent contact localization and motion analysis (CLMA) stage.

6 Claims, 4 Drawing Sheets

SYSTEM AND METHOD FOR STOCHASTIC CHARACTERIZATION OF A SIGNAL WITH FOUR EMBEDDED ORTHOGONAL MEASUREMENT DATA ITEMS

STATEMENT OF GOVERNMENT INTEREST

The invention described herein may be manufactured by or for the Government of the United States of America for Governmental purposes without the payment of any royalties thereon or therefor.

BACKGROUND OF THE INVENTION

(1) Field of the Invention

The invention relates generally to the field of systems and methods for performing digital signal processing operations in connection with signals and more particularly to systems and methods for characterizing signals to determine their stochastic properties, that is, to determine whether they are random. More particularly, it relates to a system for performing this characterization function upon signals having embedded therein four-items of mutually orthogonal measurement information. If the signals are random, they may be determined to constitute noise. If the latter is the case then the principal function of the overall signal process (e.g., extraction of the information component) and its associated computational burden can be avoided. Stated another way, the system and method allows a determination to be made of the extent to which a pattern of data items, or sample points, representing four dimensions of measurement information conforms to a random structure of data.

(2) Description of the Prior Art

Heretofore there have been developments of systems and methods for characterizing signals representing information which is representable as a composite of two and three component items of mutually orthogonal measurement information. Illustrations of these may be found in co-pending U.S. patent applications Ser. No. 08/412,260 entitled "System and Method for Processing Signals to Determine Their Stochastic Properties" (Navy Case No. 76119) and Ser. No.08/605,292, now U.S. Pat. No. 5,703,906 entitled "System for Assessing Stochastic Properties Signals Representing Three Items of Mutually Orthogonal Measurement Information" (Navy Case No. 76836).

Some signal processing systems operate on the basis of processing four mutually orthogonal items of useful measurement information and therefor could utilize a system which makes this characterization for four mutually orthogonal data items. It is accordingly desirable to be able to determine the likelihood that a signal constitutes only noise, or whether it is likely that it also includes four mutually orthogonal items of measurement information, so that a determination can be made as to whether processing of the signal to extract the information would be useful.

Illustrative of the types of signal processing applications which process four orthogonally related items of measurement information in a noisy environment are systems for tracking distant moving objects in which accuracy of estimation of the location of the object is enhanced by the processing of three mutually orthogonal sensor-based measurements, and in which clock timing constitutes the fourth item of mutually orthogonal item of measurement information. One example of this type of system is a system for tracking the landing approach of an aircraft which is described in C. M. Rekkas, et al. "Three-Dimensional Tracking Using On-Board Measurements," IEEE TRANSACTIONS ON AEROSPACE AND ELECTRONIC SYSTEMS, Vol. 27, No. 4, pages 617–623, July 1991, hereby incorporated herein by cross-reference in its entirety.

SUMMARY OF THE INVENTION

It is therefore an object of the invention to provide a novel signal processing system for processing signals which are in noisy environments and which may contain useful information comprised of four mutually orthogonal items of measurement information to determine the stochastic (randomness) properties of the signals.

Another object of the invention to provide such a novel signal processing system which of special utility in application to systems for tracking moving objects which employ three sensor-based measurement items of information, and which under scrutiny of the underlying system operation can also be seen to employ clock-based time measurements as a fourth mutually orthogonal item of measurement information.

It is a further object of the invention to provide a novel method for performing a determination of the aforedescribed stochastic properties of such a signal which as aforedescribed involves noise and four orthogonal measurement items.

It is a still further object of the invention to provide such a novel signal processing method which is of special utility in connection with such a system for tracking moving objects which as aforedescribed employs three sensor-based orthogonal measurement data items and a fourth clock time orthogonal measurement datum item.

In brief summary, the signal processing system processes an input digital signal, derived from an analog signal which includes a noise component and possibly also another component consisting of four mutually orthogonal items of measurement information. An information processing sub-system receives the digital signal and processes it to extract the information component. A noise likelihood determination sub-system receives the digital signal and generates a random noise assessment indicative of whether the digital signal comprises solely random noise, and also an assessment-indicative of the what proportion of the total signal is constituted of a random noise component. One prospective practical application for which the invention is under consideration is in preliminary processing circuitry which processes signals from sonar receivers on a naval submarine, before the signals are fed to a contact localization and motion analysis (CLMA) stage. In this application the invention would triage the received sonar signals for suitability for the CLMA stage. One illustrative CLMA stage employs the following four mutually orthogonal items of measurement information: (i) conical bearing angle of a contact emitting acoustic signal (derived from the submarine's towed sonar array): (ii) a frequency characteristic of the contact's emitted signal, (iii) a measurement of the signal-to-noise-ratio (SNR) of the sonar signal, and (iv) clock time measurements related to the sampling process involved in extracting the other measurement information from the sonar signal.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DESCRIPTION OF THE PREFERRED EMBODIMENT

Figure 1:
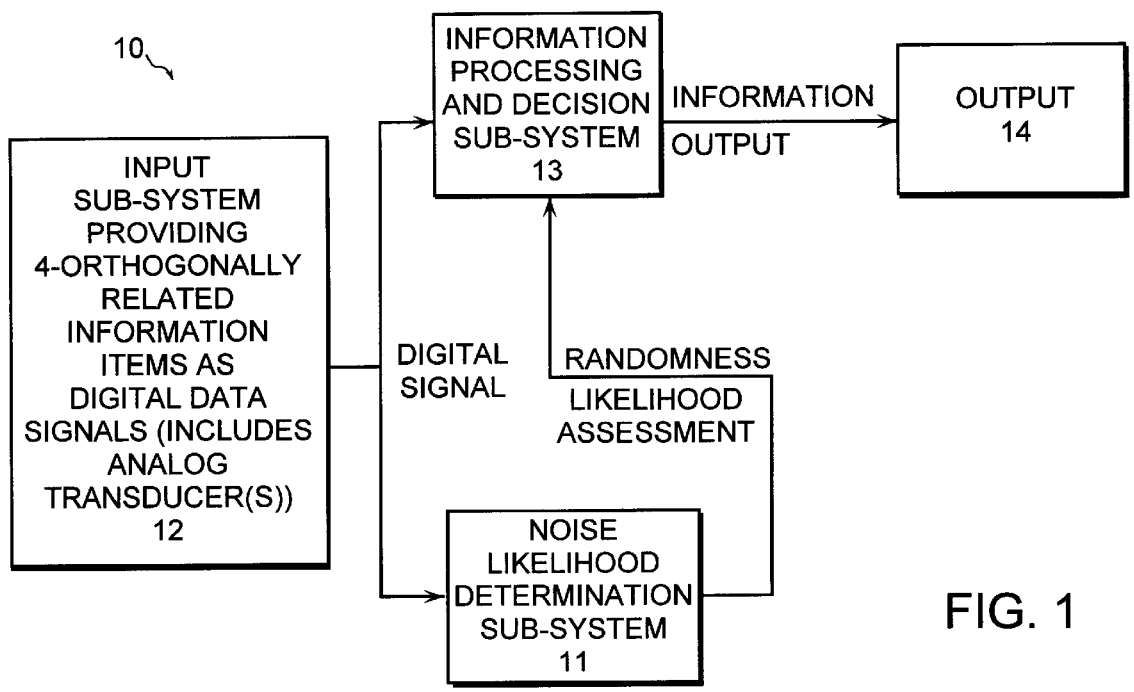
FIG. 1 is a functional block diagram representing a signal processing system which processes four items of mutually orthogonal measurement information, and which includes a stochastic characterization subsystem constructed in accordance with the present invention.

With reference to FIG. 1, a signal processing system 10 includes a noise likelihood determination sub-system 11 constructed in accordance with the invention. The signal processing system 10 includes, in addition to the noise likelihood determination sub-system 11, an input sub-system 12, an information processing and decision sub-system 13 and an output 14. Input sub-system 12 includes one or more analog transducers, and performs a front end processing function that provides a digital output signal which represents four mutually orthogonal items of measurement information (which typically are in the form of a time-multiplex message format in which three items of measurement data other than clock-based time are multiplexed signals, and clock-based time or time interval measurements are embedded in the timed relationships involved in the operation of the multiplex system). The transducer receives the signal, which is in acoustic, electrical, electromagnetic or other form and converts it to preferably digital form for processing. For example, sub-system 12 may be embodied as submarine borne sonar array transducer equipment including a front end processing stage for feeding digital data to sub-system 13 embodied as contact localization and motion analysis (CLMA) modules of the submarine's combat control system embedded as programs in programmed digital computer equipment. The signal provided to such a CLMA sub-system 13 comprises three orthogonally related sensor measured items, described in detailed later herein, and clock-based time and/or time interval measurement information, all transmitted via a multiplex system as described above. This information is derived from a passive sonar acoustic signal which emanates as emission from a sonar contact and which is received by one or more analog transducer arrays, including a linear transducer array towed behind the submarine. Such input sub-system 12 may process the received acoustic signal to provide a multiplexed digital output of items of data (sometimes hereinafter and in the appended claims referred to as "sample points" or simply "points") comprised of signal components representative of (i) signal power in a sector of conical angle representing an actual physical spatial relationship to the contact, (ii) signal power in a sector or "frequency bin" of the spectral density distribution function of the acoustic signal, (iii) signal-to-noise-ratio (SNR), and (iv) clock time measurement data related to the sampling process which generated the other measurement data. The information processing and decision sub-system 13 performs signal processing operations, such as adaptive and other filtering, to extract the information components from the digital signal. In accordance with the invention, the noise likelihood determination sub-system 11 determines the likelihood that the signal is solely noise, and also provides an assessment of the degree to which the incoming signal is composed of noise. This information will determine whether sub-system 13 would provide a useful result, and may be used to control whether or not the signal from input sub-system 12 is applied to information and decision sub-system 13.

The operations performed by the noise likelihood determination sub-system 11 will be described in connection with the flowcharts in FIGS. 2A and 2B. Basically, the noise likelihood determination sub-system 11 performs several tests in connection with digital signal sample points. Each digital signal sample point, or simply "point", within each population comprises one of a series of composite digital signals, with each composite signal containing components representing four mutually orthogonal items of measurement information. For example, the sample point may be in the form of a multiplexed message containing three sensor-based information components and also conveying the fourth clock-based information. Each sample point is generated in a symbolic four-dimensional aperture defined, for example, by a selected repetitive interval of time. In turn, each signal sample point is one of a series of such points in a selected population of "N" points. In the case of sub-system 13 embodied as CLMA subsystem of a submarine's combat system, the characteristic of mutual orthogonality of the four items of measurement information is based upon the linear independence of the measurement parameters, as will be well understood by those of skill in the art. The series of symbolic spatial apertures used in generating the various populations may be overlapping or non-overlapping. FIG. 3 is a perspective view in which the round, black dots diagrammatically represents a sequence of digital data points, each representing a signal sample point taken at successive intervals in time. It will be appreciated that a four-dimensional symbolic spatial relationship cannot be literally depicted by in a drawing. However, FIG. 3 diagrammatically illustrates a system of measurement information items having four-dimensional linear independence, consisting of three-symbolic dimensions of sensor measured items and a fourth-dimension of a clock-based time measurement, t. The "t" axis (which in the perspective view of FIG. 3 is the bottom horizontal axis) represents clock time, and the location of a black dot sample point relative thereto represents the time at which the sample point was extracted from the signal. The time axis also indicates beginning and end times of the interval of time which generates the hyperspatial aperture. Clock time constitutes one of four mutually orthogonal items of measurement information diagrammatical depicted in FIG. 3. The "x" axis (horizontal axis in the perspective view portion of the Figure) provides a Cartesian representation of the relationship of another of the four mutually orthogonal items of measurement information. The "y" axis (axis perpendicular to the hyperplane of the "t" and "x" axis in the perspective view) provides a Cartesian representation of a third of four mutually orthogonal items of measurement information. The "z" axis perpendicular to the t-x-y hyperplane provides a Cartesian representation of a fourth of the four mutually orthogonal items of measurement information. Successive populations of "N" signal sample points data are represented by successive cubical volumes, or regions of symbolic three-dimensional hyperspace, in the perspective view portion of the Figure.

Figure 2A:
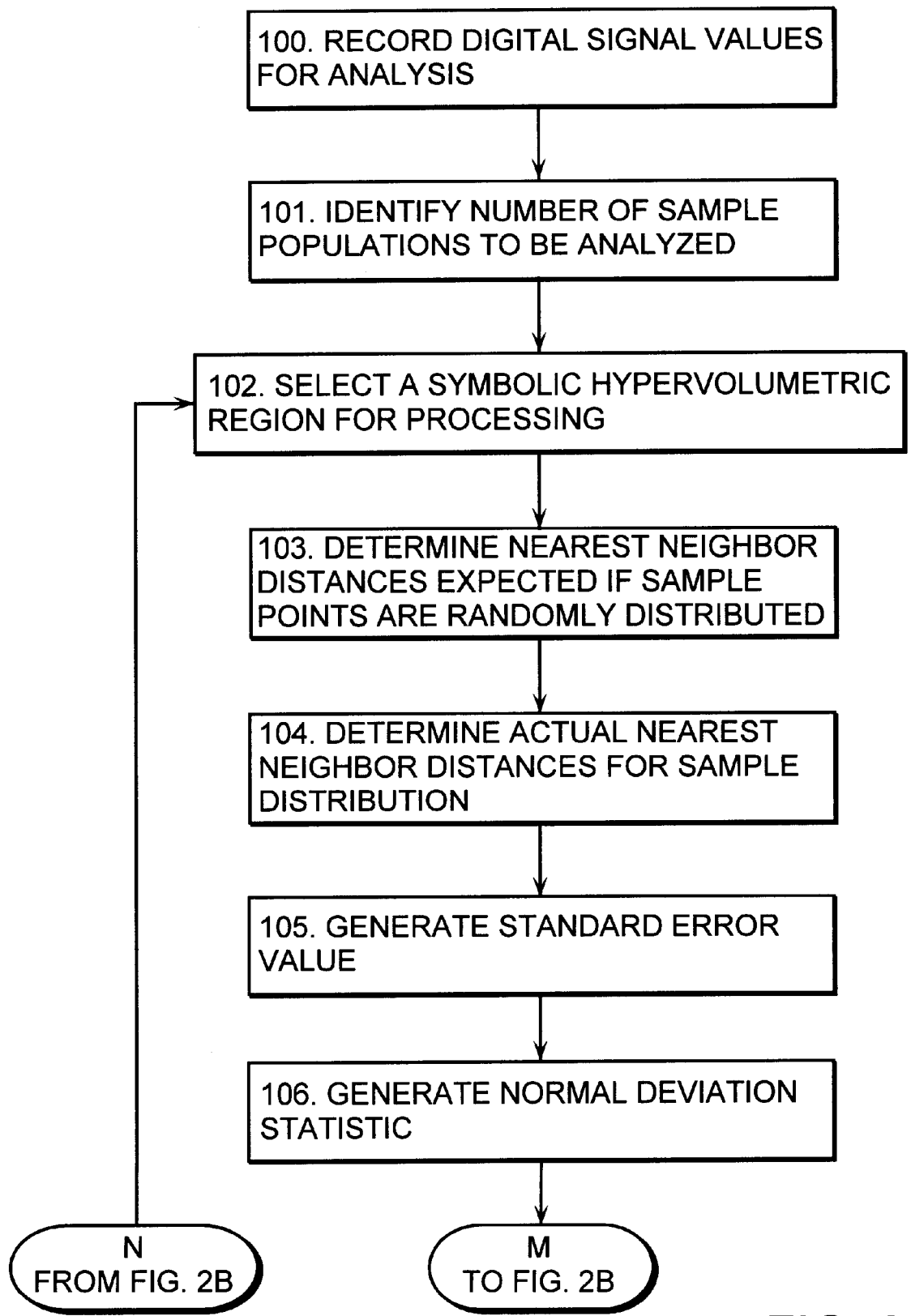
FIGS. 2A and 2B together comprise a flow chart depicting the operations of the system depicted in FIG. 1.
Figure 2B:
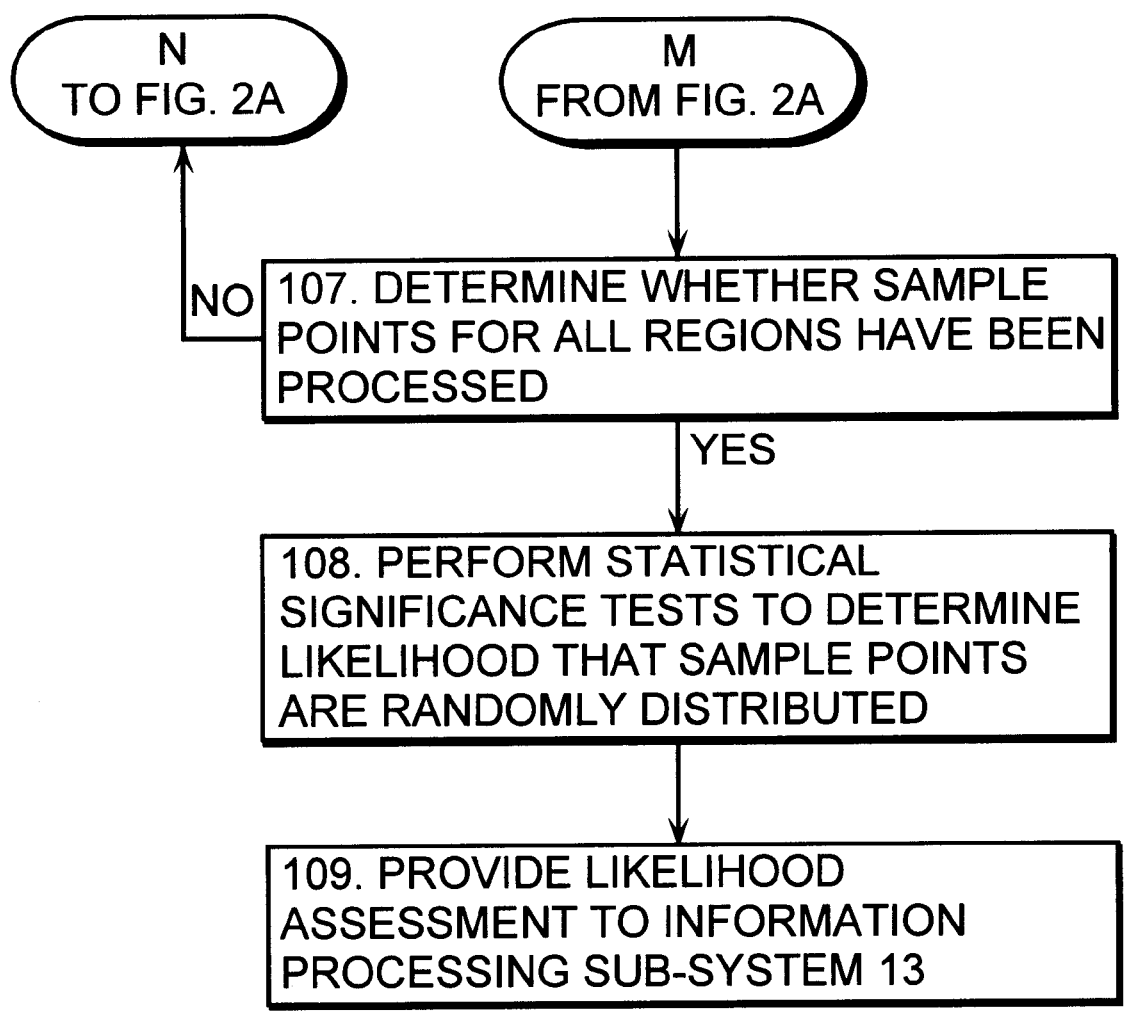
Figure 3:
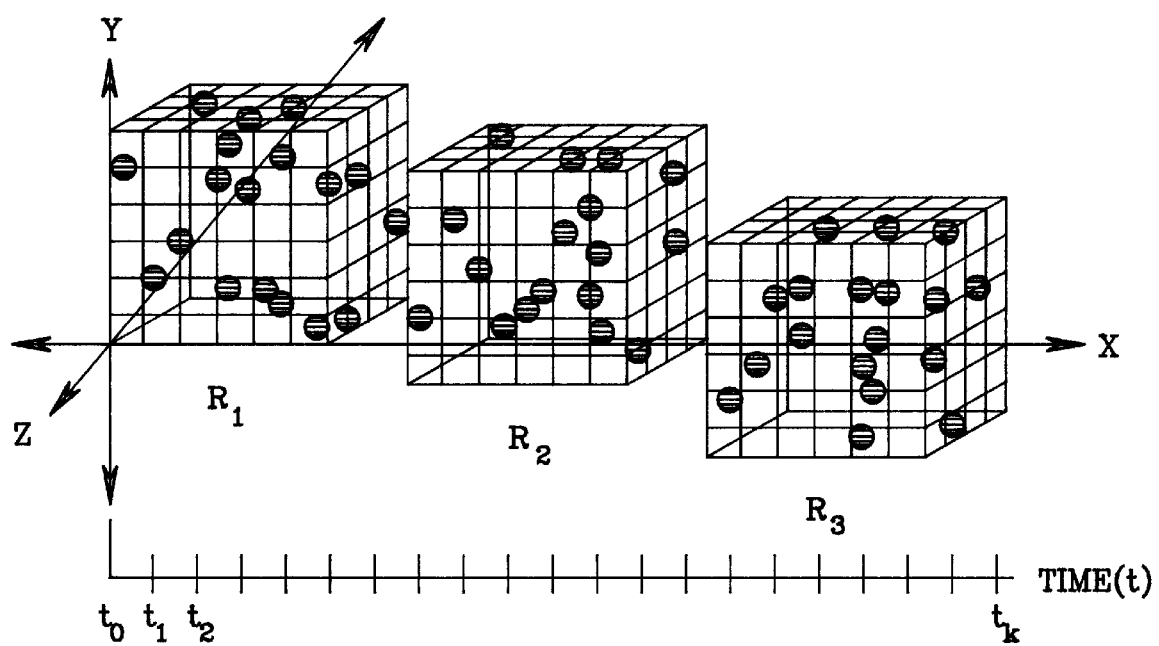
FIG. 3 is a perspective view diagrammatically representing a succession of non-overlapping, hypercubic sample regions present in a three dimensional Cartesian coordinate reference system (portion of the Figure shown as a perspective view) with each sample region partitioned into cubical sub-hypervolumes, and with the regions laid out along a time line representing the clock time of the individual samples and of the beginning and end times of the sample regions. Note that the composite arrangement of hypercubic regions and the time line constitute a representation of symbolic four-dimensional hyperspace.

With reference again to the flow chart of FIG. 2A, the noise likelihood determination sub-system 11 will initially record the digital values represented by the various sample points, such as those shown in FIG. 3, for analysis (step 100) and identify the number of populations of sample points to be analyzed (step 101).

The noise likelihood determination sub-system 11 then proceeds to a series of iterations, in each iteration selecting one sample point population and generating several metrics useful in determining the likelihood that the sample points in the population are randomly distributed in a three-dimensional spatial region containing the sample, that is, in the portion of the Cartesian space illustrated in FIG. 3 as a x-y-z symbolic cubical volume containing a population, or set, of "N" of sample points. It will be appreciated that the region (cubical volumes shown as perspective views in FIG. 3) containing each population of "N" sample points is bounded (step 102) along the time axis (that is, the "x"—or horizontal—axis shown in FIG. 3) by the beginning and end clock times for the region, and along each of the other two axes representing different ones of the mutually orthogonal items of measurement information (that is, the "x"—or horizontal—axis; the "y"—or perpendicular to "t-x" plane—axis, and the "z" or perpendicular to the t-x-y hyperplane in FIG. 3) by minimum and maximum magnitudes of measurement values chosen to be inclusive of all sample points.

In each iteration, after selecting the sample point population to be analyzed during the iteration, the noise likelihood determination sub-system 11 then determines the average distance between nearest-neighbor sample points which would be expected if the sample points were randomly-distributed in the region of interest (step 103) and the distances between nearest-neighbor sample points (step 104). Each such distance is determined as the most direct hyperlinear span across the symbolic four-dimensional space between two sample points (with the hyperlinear span almost always ending up as having a skewed four-dimensional attitude). The noise likelihood determination sub-system 11 in step 103 generates the expected average distance between nearest-neighbor sample points as $$\mu_r = 0.6081 \rho^{-\left(\frac{1}{4}\right)} \quad (1)$$

where "$\rho$" represents the spatial density of the sample points in the selected region, that is, N/V, where "N" represents the number of sample points in the selected population and "V" represents the volume of the corresponding selected four-dimensional spatial region.

The noise likelihood determination sub-system 11 in step 104 generates the actual distances between nearest-neighbor sample points as follows. Initially, the noise likelihood determination sub-system 11 establishes a distance matrix D including a number of rows and columns each associated with one of the sample points in symbolic four-dimensional hyperspace. The noise likelihood determination sub-system 11 then determines a distance value, d(i,j), representing the distance between each pair of sample points (i,j). If the sample points are considered as points in symbolic four-dimensional hyperspace (that is, with respect to a point in one of the above described set of cubical hypervolumes in hyperspace t,x,y,z FIG. 3) with the values of the coordinates given for each point the distance value representing the distance, i.e., the most direct hyperlinear span across the symbolic four-dimensional hyperspace between any two sample points "i" and "j" is $$d(i, j) = \sqrt{(x_i - x_j)^2 + (y_i - y_j)^2 + (z_i - z_j)^2 + (t_i - t_j)^2} \quad (2)$$

where $(x_i,y_i,z_i,t_i),(x_j,y_j,z_j,t_j)$ represent sampled signal data plotted as (i,j,k,l) points. The noise likelihood determination sub-system 11 inserts each distance value d(i,j) so generated in the appropriate location of a distance matrix D, and more particularly at row "i" and column "j" for each pair of sample points. Ignoring the values along the "matrix diagonal" d(i,i) of the distance matrix D (which, if generated by the noise likelihood determination sub-system 11 represent the distance between each point and itself), for each row "I," the matrix element d(I,j) ("j" being an index from "1" to the number "N" of sample points in the region) identifying the number having the lowest value is the minimum distance between the between the sample point associated with row I and any other sample point in the region. Similarly, for each column "J," the matrix element d(i,J) ("i" also being an index from "1" to the number "N" of sample points in the region) identifying the number having the lowest value is the minimum distance between the sample point associated with column J and any other sample point in the region.) Representing the minimum value in each row "I" as "min $(d_{i,j})$," the actual average distance between nearest-neighbor sample points is $$\bar{r} = \frac{1}{N}[\min(d_{1,j}) + \min(d_{2,j}) + \ldots + \min(d_{N,j})], \quad (3)$$

where "N" corresponds to the number of sample points in the region.

Following step 104, the noise likelihood determination sub-system 11 generates a standard error value $\sigma_r$ of the nearest neighbor mean distance in a random population of density $\rho$ as $$\sigma_r = \frac{\sigma}{\sqrt{N}}, \quad (4)$$

where "$\sigma$" is the standard deviation of a theoretic model of random distribution (step 105).

The noise likelihood determination sub-system 11 uses the values for $\mu_r$ (the average distance between nearest-neighbor sample points that would be expected if the distribution were randomly distributed), $\bar{r}$ (the actual average distance between nearest-neighbor sample points), and the error value $\sigma_r$ to generate a normal deviation statistic $$Z = \frac{\bar{r} - \mu_r}{\sigma_r} \quad (5)$$

(step 106) which will be used in performing a significance test as described below in connection with step 108.

Following step 106, the noise likelihood determination sub-system 11 performs a series of operations to generate a second randomness quantifier, R, which it uses in determining the likelihood that the digital signal represents a random distribution. Subsystem 11 computes the randomness quantifier in accordance with the relationship $$R = \frac{\bar{r}}{\mu_r}, \qquad (6)$$

where the symbols in both the numerator and the denominator are as hereinabove defined. Values of R range from 0 (all points congest onto a single plane), through 1.0 (indicating pure randomness), to 1.64 (all points are from a uniform distribution of polyhedrons) in four-dimensional symbolic hyperspace. Insofar as the invention is presently understood, it is believed that a value of R=0.5 represents a condition of the degree-of-randomness of a stream of incoming sample points which is generally 50% random. In connection with a prospective application of the invention to a information process and decision sub-system 13 embodied as a submarine borne contact localization and motion analysis (CLMA) sub-system (described in detail below) the value of randomness quantifier, R, has interpretive value as the upper cut-off threshold of degree of randomness beyond which sub-system would be ineffective. The CLMA sub-system which is the prospective application for system 10 is more particularly of a type which employs Bayesian-based cost function and multiple hypothesis assessment technique in providing contact localization estimates. Insofar as these techniques is presently understood, it is believe that the value of the upper cut-off threshold for this type of system is of the order of R=0.5.

The noise likelihood determination sub-system 11 generates the values for Z (equation (5)), and R (equation (6)) for each of the plurality of populations. Accordingly, after it finishes generating the values for one population, it returns to step 103 to perform the operations for the next population until it has been determined that sample points for all regions have been processed (step 107). After performing the operations to generate values for Z, and R for all of the populations, it sequences to a step 108 to perform a conventional significance test. In that operation (step 109) in connection with the value for Z, the noise likelihood determination sub-system 11 uses as the null hypothesis $$H_0: \bar{r} = \mu_r \qquad (7)$$

as indicating that the points are randomly distributed, and uses the alternate hypothesis $$H_1: \bar{r} \neq \mu_r \qquad (8)$$

as indicating that the points are not randomly distributed. It will be appreciated that, if the points are randomly distributed, the values for $\bar{r}$, the average actual distance between points in the population, would be distributed around $\mu_r$, the average distance between points that would be expected if the points were randomly distributed, in a Gaussian distribution with a mean, or average, of $\mu_r$. The standard significance test, using values for $\bar{r}$, $\mu_r$ and the normal deviate value Z, will indicate the likelihood that the null hypothesis is correct. The noise likelihood determination sub-system 11 may perform similar operations in connection with the values of R and the uniform dispersion plots generated for all of the populations, and will determine an assessment as to the likelihood that the signal as received by the transducer was totally random and if not determines a degree-of-randomness quantifier, R. Sub-system 11 provides that assessment to the information processing sub-system 13. As has been discussed above, the information processing sub-system 13 can use the randomness assessment in determining the utility of having an output from information processing system 13 appear at output 14, as will be presently illustrated.

An exemplary embodiment of information processing sub-system 13 comprises a submarine borne contact localization and motion analysis (CLMA) information processing and decision sub-system which is responsive to passive sonar signals received (i) by a towed linear array trailing behind the submarine, and (ii) by a spherical transducer array at the submarine's bow. Measurement information representing clock times at the ends of the time intervals employed in generating sample points is internally available in the combat control equipment. Measurement information representing an actual physical relationship between the contact and the towed array (signal power in a conical angle sector representing conical bearing angle of a sonar contact relative to the axis of the towed array) is gathered by the towed array. Measurement information representing a frequency characteristic (signal power in a sector of the signal's spectral frequency distribution function) may be gathered by either the spherical array or the towed array or both. Measurement information representing signal-to-noise-ratio (SNR) may be gathered by the spherical array, towed array or both. The CLMA information processing and decision sub-system 13 is of a type which employs well known Bayesian-based statistical cost function techniques and well known multiple hypothesis assessment techniques to generate space-contact state estimations of the location of the contact. System 10 is provided with a suitable control mechanism to prevent appearance of any signal at output 14 if: (i) the signal from input subsystem 12 results in a "null hypothesis" determination (equation (7)), i.e., the input signal is essentially solely random noise; or (ii) the signal results in an "alternate hypothesis" (equation (8)) determination, but sub-system 11 further determines the value of degree of randomness quantifier from input sub-system is a value greater than R=0.5 (namely a value consistent with the above discussed believed upper cut-of threshold of quantifier value for sub-system 13 to be effective). Suitable control logic (not shown) is provided within system 10 to prevent appearance of a signal at output 14. The logic can implement this by any suitable mode such as blocking coupling from input sub-system 12 to sub-system 13, disabling sub-system 13, or blocking coupling from the output of sub-system 13 to output 14.

It will be appreciated by those skilled in the art that some or all of the inventive system and method may be implemented or performed using suitably programmed digital computing equipment or special-purpose hardware.

Although the noise likelihood determination sub-system 11 has been described in connection with assessing randomness in connection with a signal, such as an acoustic, electrical or electromagnetic signal, it will be appreciated that the sub-system 11 will find utility in other areas in which it is desirable to assess randomness. An example of another application of noise likelihood determination sub-system 11 is in the area of non-linear dynamics in which it is of interest to know whether data in four-dimensional hyperspace has a structure that is deterministically random (or chaotic) or is stochastically random. The present method, by employing the above described randomness determination techniques for a mutually orthogonal measurement will render insight into such issue. Also, although the invention has been described in relation to implementation by a Cartesian reference coordinate system, sub-system 11 will also find utility in embodiments that employ spherical, or other coordinate systems.

The preceding description has been limited to a specific embodiment of this invention and the variations just discussed. It will be apparent, however, that even other variations and modifications may be made to the invention, with the attainment of some or all of the advantages of the invention. Therefore, it is the object of the appended claims to cover all such variations and modifications as come within the true spirit and scope of the invention.

What is claimed is:

1. A signal processing system comprising:
   means, including a transducer means, for receiving an analog signal which includes an information component and a noise component and for processing the analog signal to provide a digital signal comprising sample point measurements representing four mutually orthogonal items of measurement information, said sample point measurements being generated for a series of four-dimensional symbolical spatial aperture in which three non-time related items of orthogonal information are in a symbolic hypervolume reference subsystem and the fourth item of orthogonal information is clock time of sampling events in a four-dimensional hyperspace reference system which includes said hypervolume reference sub-system;
   an information processing sub-system for receiving said digital signal and for processing it to extract said information component;
   a noise likelihood determination sub-system for receiving said digital signal and for generating a random noise assessment that the digital signal comprises random noise, the noise likelihood determination sub-system controlling the information processing sub-system in response to the random noise assessment, the random noise assessment being further generated in response to a nearest-neighbor distance deviation assessment generated in response to nearest-neighbor ones of the sample points in comparison with distances of the most direct hyperlinear spans across the four-dimensions of symbolic reference hyperspace between a like number of nearest-neighbor reference points that are randomly distributed, the nearest-neighbor distance deviation further being generated for a plurality of selected sample point populations, each such selected population comprising a plurality of "N" sample point measurements, the random noise assessment further being generated in response to a standard significance test in connection with the nearest-neighbor distance deviation assessments generated for said populations;
   said noise likelihood determination sub-system further including randomly distributed nearest neighbor reference point distance determination means for generating an expected average distance value $\mu_r$ between such reference points within a four-dimensional symbolic hyperspatial region containing a corresponding sample point population as $$\mu_r = 0.6081 \rho^{-\left(\frac{1}{4}\right)}$$

where "$\rho$" represents the four-dimensional hyperspatial density of reference points in the region containing the corresponding sample point population;
   said noise likelihood determination sub-system still further including sample point distance determination means for generating an average nearest-neighbor sample point distance value as $$\bar{r} = 1/N[min(d_{1j}) + min(d_{2j}) + \ldots + min(d_{Nj})],$$

where "$min(d_{ij})$" corresponds to a minimum distance of such most direct lineal span across the reference four-dimensional symbolic hyperspace between nearest neighbor sample points identified by indices "i" and "j"; and
   said noise likelihood determination subsystem yet further including nearest-neighbor distance deviation assessment generating means for generating the nearest-neighbor distance deviation assessment value as $$Z = \frac{\bar{r} - \mu_r}{\sigma_r},$$

where $$\sigma_r = \frac{\sigma}{\sqrt{N}},$$

and a $\sigma$ is the standard deviation of a theoretical model of random distribution.

2. A signal processing system as defined in claim 1 in which said noise likelihood determination sub-system includes randomness statistic generating means for generating a randomness statistic in response to an interpoint spacing parameter statistic, the noise likelihood determination sub-system generating the random noise assessment in response to the randomness statistic.

3. A signal processing system as defined in claim 2 in which the randomness statistic generating means includes means for generating a randomness quantifier, R, in accordance with the relationship $$R = \frac{\bar{r}}{\mu_r},$$

4. A signal processing system as defined in claim 1 wherein the received analog signal is an underwater acoustic signal and said three orthogonal items of non-time related measurement information of a sample point comprise an actual physical spatial relationship between the source of the acoustic signal and the transducer means, a frequency characteristic of the acoustic signal, and a measurement of signal-to-noise-ratio (SNR), and said fourth item of orthogonal measurement information comprises a clock time measurement data related to the sampling process which generates said sample point measurements.

5. A signal processing system as defined in claim 4 wherein said actual physical spatial relationship, signal frequency characteristic, and SNR items of measurement information are multiplexed components of a time-multiplex message signal, and said clock time is embedded in timing structure of the time-multiplex message signal.

6. A signal processing system as defined in claim 1 wherein said symbolic four-dimensional hyperspatial reference system is of the Cartesian coordinate type.

* * * * *